(12) United States Patent
Volmerding et al.

(10) Patent No.: US 12,140,096 B2
(45) Date of Patent: Nov. 12, 2024

(54) SYSTEMS AND METHODS FOR REDUCING AFTERTREATMENT SYSTEM $NO_X$ EMISSIONS

(71) Applicant: Cummins Emission Solutions Inc., Columbus, IN (US)

(72) Inventors: Matthew K. Volmerding, Columbus, IN (US); Simon Guest, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/231,505

(22) Filed: Aug. 8, 2023

(65) Prior Publication Data

US 2023/0383707 A1    Nov. 30, 2023

Related U.S. Application Data

(62) Division of application No. 17/851,832, filed on Jun. 28, 2022, now Pat. No. 11,946,428.

(Continued)

(51) Int. Cl.
*F02D 41/02* (2006.01)
*F01N 3/021* (2006.01)
(Continued)

(52) U.S. Cl.
CPC .......... *F02D 41/024* (2013.01); *F01N 3/021* (2013.01); *F01N 3/2013* (2013.01);
(Continued)

(58) Field of Classification Search
CPC .... F02D 41/024; F02D 41/042; F02D 41/062; F02D 2200/0802; F02D 2200/70;
(Continued)

(56) References Cited

U.S. PATENT DOCUMENTS 7,779,634 B2    8/2010    Barthelet et al.
8,671,666 B2    3/2014    Yezerets et al.
(Continued)

FOREIGN PATENT DOCUMENTS

EP    3 184 769 A1    6/2017
WO    WO-2017/151959 A1    9/2017

OTHER PUBLICATIONS

Office Action in U.S. Appl. No. 17/851,832, issued Aug. 31, 2023.

*Primary Examiner* — Brandon D Lee
(74) *Attorney, Agent, or Firm* — Foley & Lardner LLP (57) ABSTRACT

A controller for an aftertreatment system coupled to an engine is configured to: in response to receiving an engine shutdown signal, determine an estimated amount of ammonia stored on a selective catalytic reduction (SCR) catalyst included in the aftertreatment system; in response to determining that the estimated amount of ammonia stored in the SCR catalyst is less than an ammonia storage threshold, cause flow of a heated gas towards the SCR catalyst; cause insertion of a reductant into an exhaust gas flowing through the aftertreatment system; and in response to determining that the estimated amount of ammonia stored in the SCR catalyst is equal to or greater than the ammonia storage threshold, cause shutdown of the engine.

9 Claims, 5 Drawing Sheets

Related U.S. Application Data (60) Provisional application No. 63/216,105, filed on Jun. 29, 2021.

(51) Int. Cl.

| | | |
|---|---|---|
| *F01N 3/20* | (2006.01) | |
| *F01N 3/22* | (2006.01) | |
| *F01N 3/32* | (2006.01) | |
| *F02B 37/04* | (2006.01) | |
| *F02B 37/12* | (2006.01) | |
| *F02D 41/04* | (2006.01) | |
| *F02D 41/06* | (2006.01) | |

(52) U.S. Cl.
CPC ........... *F01N 3/2033* (2013.01); *F01N 3/208* (2013.01); *F01N 3/32* (2013.01); *F02B 37/12* (2013.01); *F02D 41/042* (2013.01); *F02D 41/062* (2013.01); *F01N 3/2006* (2013.01); *F01N 3/22* (2013.01); *F01N 3/323* (2013.01); *F01N 2610/02* (2013.01); *F01N 2610/10* (2013.01); *F01N 2610/1406* (2013.01); *F01N 2900/12* (2013.01); *F01N 2900/1402* (2013.01); *F01N 2900/16* (2013.01); *F01N 2900/1602* (2013.01); *F02B 37/04* (2013.01); *F02D 2200/0802* (2013.01); *F02D 2200/70* (2013.01)

(58) Field of Classification Search
CPC ..... F02D 2041/1468; F02D 2200/0414; F01N 3/021; F01N 3/2013; F01N 3/2033; F01N 3/208; F01N 3/32; F01N 2610/02; F01N 2610/10; F01N 2610/1406; F01N 2900/1402; F01N 2900/16; F01N 3/0253; F01N 2900/1616; F01N 2900/1622; F01N 2900/1404; F01N 2900/1602; F01N 2900/12; F01N 3/323; F01N 3/22; F01N 3/2006; F02B 37/12; F02B 37/04; Y02T 10/12

See application file for complete search history.

(56) References Cited

U.S. PATENT DOCUMENTS

| | | |
|---|---|---|
| 8,727,050 B2 | 5/2014 | Roos et al. |
| 10,738,672 B2 | 8/2020 | Harmsen et al. |
| 2004/0007403 A1* | 1/2004 | Tomatsuri ............. B60K 6/445 180/65.235 |
| 2012/0023906 A1 | 2/2012 | Yezerets et al. |
| 2013/0213010 A1 | 8/2013 | Zhang et al. |
| 2014/0343747 A1 | 11/2014 | Culbertson et al. |
| 2015/0013309 A1 | 1/2015 | Upadhyay et al. |
| 2015/0014292 A1* | 1/2015 | Sakuma ................ F01N 3/2026 219/162 |
| 2015/0083093 A1* | 3/2015 | Desai .................. F02M 31/042 123/556 |
| 2015/0300277 A1 | 10/2015 | Stenlaas et al. |
| 2018/0142594 A1 | 5/2018 | Chaineux et al. |
| 2018/0258873 A1 | 9/2018 | Haas et al. |
| 2020/0123951 A1 | 4/2020 | Ciaravino et al. |
| 2021/0054772 A1 | 2/2021 | Williams et al. |
| 2022/0010742 A1* | 1/2022 | Cox .................... F02N 11/0829 |

* cited by examiner

SYSTEMS AND METHODS FOR REDUCING AFTERTREATMENT SYSTEM $NO_X$ EMISSIONS

CROSS-REFERENCE TO RELATED PATENT APPLICATION

This Application is a divisional of U.S. patent application Ser. No. 17/851,832, filed Jun. 28, 2022, which claims the benefit of U.S. Provisional Patent Application No. 63/216,105, filed Jun. 29, 2021. The contents of these applications are incorporated herein by reference.

TECHNICAL FIELD

The present disclosure relates generally to aftertreatment systems for use with internal combustion engines.

BACKGROUND

Exhaust aftertreatment systems are used to receive and treat exhaust gas generated by engines such as IC engines. Conventional exhaust gas aftertreatment systems include any of several different components to reduce the levels of harmful exhaust emissions present in exhaust gas. For example, certain exhaust aftertreatment systems for diesel-powered IC engines includes a selective catalytic reduction (SCR) catalyst formulated to convert $NO_X$ (NO and $NO_2$ in some fraction) into harmless nitrogen gas ($N_2$) and water vapor ($H_2O$) in the presence of ammonia ($NH_3$).

Generally, a reductant such as a diesel exhaust fluid (e.g., an aqueous urea solution) is inserted into the aftertreatment system as a source of ammonia. The reductant facilitates the decomposition of the constituents of the exhaust gas by a SCR catalyst included in the aftertreatment system. Increasingly stringent emission regulations require high catalytic conversion efficiency of the SCR catalyst even when an engine is started cold. Catalytic conversion efficiency of the SCR catalyst depends upon an amount of ammonia stored in the SCR catalyst and the operating temperature of the SCR catalyst. Thus, a target catalytic conversion efficiency can be a challenge to obtain, particularly in instances when the engine starts cold—for example, after a substantial shutdown period.

SUMMARY

Embodiments described herein relate generally to systems and methods for reducing aftertreatment emissions, and in particular, to systems and methods that delay shutdown of an engine while heating an exhaust gas produced by the engine until an ammonia stored on a SCR catalyst is above a threshold, and/or delay starting of the engine while preheating the SCR catalyst to above a SCR temperature threshold such that a high SCR catalytic conversion efficiency (CE) is achieved when the engine starts.

In some embodiments, a controller for an aftertreatment system coupled to an engine is configured to: in response to receiving an engine shutdown signal, determine an estimated amount of ammonia stored on a SCR catalyst included in the aftertreatment system; in response to determining that the estimated amount of ammonia stored in the SCR catalyst is less than an ammonia storage threshold, cause flow of a heated gas towards the SCR catalyst for a time period; cause insertion of reductant into an exhaust gas flowing through the aftertreatment system; and in response to determining that the estimated amount of ammonia stored in the SCR catalyst is equal to or greater than the ammonia storage threshold, cause shutdown of the engine.

In some embodiments, a controller for an aftertreatment system coupled to an engine is configured to: in response to receiving an engine start signal, determine if a temperature of at least one of a component included in the aftertreatment system, a system associated with the aftertreatment system, and/or ambient environment is less than a temperature threshold without starting the engine; in response to the temperature being less than the temperature threshold, activate a heater included in the aftertreatment system for a predetermined period of time without starting the engine; cause flow of a gas through the heater towards a SCR catalyst included in the aftertreatment system so as to heat the SCR catalyst; and in response to the temperature being equal to or greater than the temperature threshold, cause the engine to start.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for reducing aftertreatment emissions, and in particular, to systems and methods that delay shutdown of an engine while heating an exhaust gas produced by the engine until an ammonia stored on a SCR catalyst is above a threshold, and/or delay starting of the engine while preheating the SCR catalyst to above a SCR temperature threshold such that a high SCR catalytic CE is achieved when the engine starts.

Increasingly stringent emission regulations require high catalytic conversion efficiency from the SCR catalyst even when an engine is started cold. Catalytic conversion efficiency of the SCR catalyst depends upon an amount of ammonia stored in the SCR catalyst, and the operating temperature of the SCR catalyst, which can be a challenge to maintain at cold start of the engine. For example, the SCR catalyst of an aftertreatment system may not have sufficient ammonia stored therein before the engine coupled to the aftertreatment system is shutdown. Thus, the next time when the engine is started, the SCR catalyst would not have sufficient ammonia stored therein for optimal $NO_X$ conversion, which can lead to $NO_X$ emissions that exceed emission limits. Moreover, SCR catalysts generally have to operate at an operational temperature (e.g., greater than 350 degrees Celsius) for efficiently decomposing $NO_X$ gases. However, at cold engine start, particularly under cold ambient conditions (e.g., less than −10 degrees Celsius), the SCR catalyst may be at a lower temperature than its operational temperature which can lead to $NO_X$ emissions exceeding emissions limits.

In contrast, various embodiments of the systems and methods described herein for reducing $NO_X$ emissions may provide one or more benefits including, for example: (1) increasing ammonia storage of one of more SCR catalysts included in an aftertreatment system on engine shutdown such that the SCR catalyst has sufficient ammonia stored thereon for optimal $NO_X$ decomposition the next time the engine is started; (2) enabling SCR catalyst operation at its operational temperature at engine start to provide a desired SCR catalytic CE at engine start; (3) reducing $NO_X$ emission levels to less than 0.12 g/kWhr at ambient temperatures of less than −10 degrees Celsius without any cold/warm cycle weighting; (4) enabling shorter power cycle of about 0.5 WHTC power length; and (5) allowing operation at any altitude while obtaining desired SCR catalytic CE.

Figure 1:
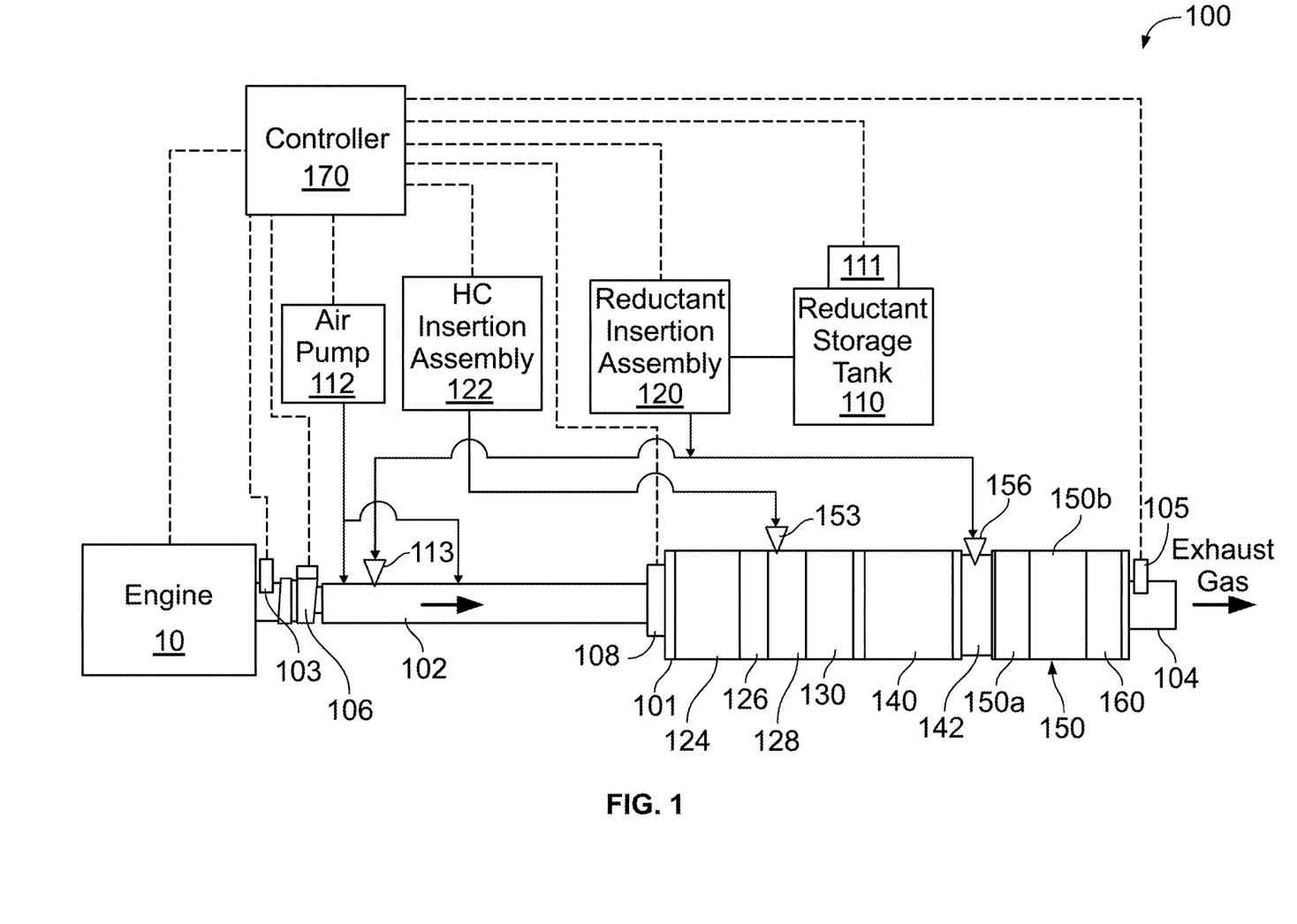
FIG. 1 is a schematic illustration of an aftertreatment system, according to an embodiment.

FIG. 1 is a schematic illustration of an aftertreatment system 100, according to an embodiment. The aftertreatment system 100 is configured to receive exhaust gas (e.g., diesel exhaust gas) from an engine 10 and treat constituents (e.g., $NO_x$, CO, $CO_2$) of the exhaust gas. The aftertreatment system 100 includes a reductant storage tank 110, a reductant insertion assembly 120, a SCR catalyst 150, and a controller 170, and may optionally also include a turbo 106, an air pump 112, a hydrocarbon insertion assembly 122, a heater 108, an upstream SCR catalyst 124, an upstream ammonia oxidation catalyst ($AMO_X$) 128, an upstream mixer 128, an oxidation catalyst 130, a filter 140, a downstream mixer 142, and a downstream $AMO_X$ catalyst 160.

The engine 10 may include, for example, a diesel engine, a gasoline engine, a natural gas engine, a dual fuel engine, a biodiesel engine, an E-85 engine, or any other suitable engine). In some embodiments, the engine 10 includes a diesel engine. The engine 10 combusts fuel and generates an exhaust gas that includes $NO_x$, CO, $CO_2$, and other constituents.

The aftertreatment system 100 includes a housing 101 within which components of the aftertreatment system 100 are disposed. The housing 101 may be formed from a rigid, heat-resistant and corrosion-resistant material, for example stainless steel, iron, aluminum, metals, ceramics, or any other suitable material. The housing 101 may have any suitable cross-section, for example, circular, square, rectangular, oval, elliptical, polygonal, or any other suitable shape.

An inlet conduit 102 is fluidly coupled to an inlet of the housing 101 and structured to receive exhaust gas from the engine 10 and communicate the exhaust gas to an internal volume defined by the housing 101. Furthermore, an outlet conduit 104 may be coupled to an outlet of the housing 101 and structured to expel treated exhaust gas into the environment (e.g., treated to remove particulate matter such as soot by the filter 140 and/or reduce constituents of the exhaust gas such as $NO_X$ gases, CO, unburnt hydrocarbons, etc. included in the exhaust gas by the SCR catalyst 124 and/or 150 and the oxidation catalyst 130).

A first sensor 103 may be positioned in the inlet conduit 102. The first sensor 103 may comprise a $NO_X$ sensor configured to measure an amount of $NO_X$ gases included in the exhaust gas flowing into the aftertreatment system 100, and may include a physical sensor or a virtual sensor. In various embodiments, a temperature sensor, a pressure sensor, an oxygen sensor or any other sensor may also be positioned in the inlet conduit 102 so as to determine one or more operational parameters of the exhaust gas flowing through the aftertreatment system 100.

A second sensor 105 may be positioned in the outlet conduit 104. The second sensor 105 may comprise a second $NO_X$ sensor configured to determine an amount of $NO_X$ gases expelled into the environment after passing through the SCR catalyst 150. In other embodiments, the second sensor 105 may comprise a particulate matter sensor configured to determine an amount of particulate matter (e.g., soot included in the exhaust gas exiting the filter 140) in the exhaust gas being expelled into the environment. In still other embodiments, the second sensor 105 may comprise an ammonia sensor configured to measure an amount of ammonia in the exhaust gas flowing out of the SCR catalyst 150, i.e., determine the ammonia slip. This may be used as a measure of a catalytic conversion efficiency of the SCR catalyst 124 and/or 150 for adjusting an amount of reductant to be inserted into the SCR catalyst 124 and/or 150, and/or adjusting a temperature of the SCR catalyst 124 and/or 150 so as to allow the SCR catalyst 124 and/or 150 to effectively use the ammonia for catalytic decomposition of the $NO_X$ gases included in the exhaust gas flowing therethrough.

In some embodiments, a turbo 106 (e.g., a turbocharger, or a supercharger) may be disposed proximate to an upstream end of the inlet conduit 102, for example, proximate to an outlet of the engine 10. The turbo 106 may include a turbine that is powered by the exhaust generated by the engine 10 or a power source (not shown) such as a battery associated with the engine 10, and configured to provide pressurized air to the engine 10. In some embodiments, the turbo 106 may also be used to flow air through the aftertreatment system 100, for example, to facilitate preheating of components of the aftertreatment system 100, as described in further detail herein. The turbo 106 may include an electric turbo (e-turbo). In other embodiments, the turbo 106 may include an electric compressor (e-compressor) as part of a two-stage turbo system.

In some embodiments, an upstream reductant port 113 may be provided in the inlet conduit 102 through which reductant may be inserted into the inlet conduit 102 by the reductant insertion assembly 120. In some embodiments, the aftertreatment system 100 also includes air pump 112 (e.g., a fan, a centrifugal pump, a blower, etc.). The air pump 112 may be fluidly coupled to the inlet conduit 102 upstream or downstream of the upstream reductant port 113, and configured to selectively pump air into the inlet conduit 102 towards the components of the aftertreatment system 100 to facilitate preheating of components of the aftertreatment system 100, as described herein.

A heater 108 is disposed proximate to an inlet of the housing 101, and is configured to preheat exhaust gas or air being communicated into the housing 101 towards the aftertreatment components of the aftertreatment system 100. In some embodiments, the heater 108 may include an electric heater having a heater power of greater than 10 kW (e.g., 12, 14, 16, 18, 20, 22, 24, 26, 28, 30, 32, 34, 36, 38, or 40 kW, inclusive). The heater 108 may include any suitable structure. In some embodiments, the heater 108 may include a standalone metallic type grid heater, an electrically heated metallic substrate, or metallic elements embedded within a cordierite substrate.

The SCR catalyst 150 is formulated to decompose constituents of an exhaust gas flowing therethrough in the presence of a reductant, as described herein. In some embodiments, the SCR catalyst 150 may include a selective catalytic reduction filter (SCRF). Any suitable SCR catalyst 150 may be used such as, for example, platinum, palladium, rhodium, cerium, iron, manganese, copper, vanadium based catalyst, any other suitable catalyst, or a combination thereof. The SCR catalyst 150 may be disposed on a suitable substrate such as, for example, a ceramic (e.g., cordierite) or metallic (e.g., kanthal) monolith core which can, for example, define a honeycomb structure. A washcoat can also be used as a carrier material for the SCR catalyst 150. Such washcoat materials may comprise, for example, aluminum oxide, titanium dioxide, silicon dioxide, any other suitable washcoat material, or a combination thereof. In some embodiments, the SCR catalyst 150 includes an upstream SCR catalyst portion 150a comprising a first catalyst material, and a downstream SCR catalyst portion 150b comprising a second catalyst material different from the first catalyst material. In some embodiments, the first catalyst material is iron zeolite (FeZe) and the second material is copper zeolite (CuZe). The downstream $AMO_X$ catalyst 160 (e.g., an ammonia oxidation catalyst) may be positioned downstream of the SCR catalyst 150 so as to decompose any unreacted ammonia in the exhaust gas downstream of the SCR catalyst 150.

In some embodiments, a mixer 142 (e.g., a vane mixer, or a baffle mixer) is disposed in the housing 101 upstream of the SCR catalyst 150. A reductant port 156 may be coupled to the housing 101 upstream of or over the mixer 142. Reductant is inserted by the reductant insertion assembly 120 into the exhaust gas flowing through the mixer 142, and the mixer 142 facilitates mixing of the reductant with the exhaust gas, for example, by creating vortices or turbulence in the exhaust gas as the exhaust gas flows therethrough towards the SCR catalyst 150.

In some embodiments, the aftertreatment system 100 also includes the upstream SCR catalyst 124 positioned upstream of the SCR catalyst 150. For example, the upstream SCR catalyst 124 may be disposed proximate to an inlet of the housing 101 such that the upstream SCR catalyst 124 is the first aftertreatment component encountered by the exhaust gas. In such embodiments, the aftertreatment system 100 includes the upstream reductant port 113 through which reductant is inserted into the exhaust gas as it flows through the inlet conduit 102 towards the upstream SCR catalyst 124. In some embodiments, the upstream SCR catalyst 124 may include a vanadium catalyst. An upstream $AMO_X$ catalyst 126 may be positioned downstream of the upstream SCR catalyst 124 and configured to decompose unreacted ammonia that still remains in the exhaust gas after passing through the upstream SCR catalyst 124.

The oxidation catalyst 130 may be positioned upstream of the SCR catalyst 150 and downstream of the upstream $AMO_X$ catalyst 126. In some embodiments, the oxidation catalyst 130 may include a diesel oxidation catalyst. The oxidation catalyst 130 is configured to decompose unburnt hydrocarbons and/or CO included in the exhaust gas. The filter 140 is disposed downstream of the oxidation catalyst 130 and upstream of the SCR catalyst 150 and configured to remove particulate matter (e.g., soot, debris, inorganic particles, etc.) from the exhaust gas. In various embodiments, the filter 140 may include a ceramic filter. In some embodiments, the filter 140 may include a cordierite filter which can, for example, be an asymmetric filter. In yet other embodiments, the filter 140 may be catalyzed.

In some embodiments, the aftertreatment system 100 may also include the hydrocarbon insertion assembly 122. The hydrocarbon insertion assembly 122 is configured to insert hydrocarbons (e.g., diesel) into the exhaust gas. An upstream mixer 128 (e.g., a vane or baffle mixer) may be disposed upstream of the oxidation catalyst 130 and downstream of the upstream $AMO_X$ catalyst 126. A hydrocarbon insertion port 153 may be provided in the housing 101 upstream of or on the upstream mixer 128 and configured to allow insertion of hydrocarbons into the housing 101. The upstream mixer 128 facilitates mixing of the inserted hydrocarbons with the exhaust gas as the exhaust gas flows towards the oxidation catalyst 130. The oxidation catalyst 130 catalyzes the combustion of the hydrocarbons which increases the temperature of the exhaust gas. Heating the exhaust gas may be used to regenerate the filter 140 by burning off particulate matter that may have accumulated on the filter 140, and/or regenerate the SCR catalyst 150 by evaporating reductant deposits deposited on the SCR catalyst 150. In some embodiments, the hydrocarbon insertion assembly 122 may be used instead, or additionally with the heater 108 for heating downstream components of the aftertreatment system 100.

The reductant storage tank 110 is structured to store a reductant. The reductant is formulated to facilitate decomposition of the constituents of the exhaust gas (e.g., $NO_X$ gases included in the exhaust gas). Any suitable reductant may be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In some embodiments, the reductant can comprise an aqueous urea solution including 32.5% by volume of urea and 67.5% by volume of deionized water, including 40% by volume of urea and 60% by volume of deionized water, or any other suitable ratio of urea to deionized water.

A reductant insertion assembly 120 is fluidly coupled to the reductant storage tank 110. The reductant insertion assembly 120 is configured to selectively insert the reductant into the SCR catalyst 150 or upstream thereof (e.g., into the inlet conduit 102) or a mixer (not shown) positioned upstream of the SCR catalyst 150. The reductant insertion assembly 120 may comprise various structures to facilitate receipt of the reductant from the reductant storage tank 110 and delivery to the SCR catalyst 150, for example, pumps, valves, screens, filters, etc.

The aftertreatment system 100 may also comprise one or more reductant injectors fluidly coupled to the reductant insertion assembly 120 and configured to insert the reductant (e.g., a combined flow of reductant and compressed air) into the SCR catalyst 150. In various embodiments, the one or more reductant injectors may include a nozzle having predetermined diameter. In various embodiments, the reductant injector may be positioned in the reductant port 156 and/or the upstream reductant port 113 and structured to deliver a stream or a jet of the reductant into the internal volume of the housing 101 or the inlet conduit 102 so as to deliver the reductant to the SCR catalyst 150 or the upstream SCR catalyst 124, respectively.

The controller 170 is operatively coupled to the reductant insertion assembly 120, the first sensor 103, the second sensor 105, the heater 108, and in some embodiments, the air pump 112, and the hydrocarbon insertion assembly 122. For example, the controller 170 may be communicatively coupled to the first sensor 103 and may be configured to receive a first sensor signal from the first sensor 103, for example, to determine an amount of $NO_X$ gases included in the exhaust gas entering the aftertreatment system 100. The controller 170 may also be communicatively coupled to the second sensor 105 and may be configured to determine a concentration of $NO_X$ gases or ammonia included in the exhaust gas being expelled into the environment.

The controller 170 may be configured to determine the SCR catalytic CE of the SCR catalyst 124 and/or 150 based on the inlet $NO_X$ amount of $NO_X$ gases entering the aftertreatment system 100, and the outlet $NO_X$ amount of $NO_X$ gases exiting the aftertreatment system 100. For example, the controller 170 may determine a difference between the inlet $NO_X$ amount and the outlet $NO_X$ amount and determine the SCR catalytic CE based on the difference.

The controller 170 may also be configured to determine an amount of ammonia slip, i.e., an amount of ammonia gas in the exhaust gas downstream of the SCR catalyst 150 based on the second sensor signal (e.g., an outlet $NO_X$ signal) received from the second sensor 105. For example, the controller 170 may be configured to correlate the outlet $NO_X$ amount measured by the outlet $NO_X$ sensor to an amount of reductant inserted into the aftertreatment system 100, and determine the amount of ammonia slip therefrom. The controller 170 may be configured to command the reductant insertion assembly 120 to adjust an amount of the reductant inserted into the aftertreatment system 100 based on the inlet $NO_X$ amount, the SCR catalytic CE, an exhaust gas temperature at an inlet of the SCR catalyst 124 and/or 150 (e.g., determined by temperature sensors that may be located at various positions in the aftertreatment system 100), an exhaust gas flow rate and/or any other exhaust gas parameter.

The controller 170 may be operably coupled to the engine 10, the first sensor 103, the second sensor 105, the reductant insertion assembly 120, the air pump 112, the hydrocarbon insertion assembly 122, the heater 108, and various components of the aftertreatment system 100 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

In some embodiments, the controller 170 is configured to cause reduction in $NO_X$ emissions from the aftertreatment system 100 at a subsequent engine start by optimizing ammonia storage of the SCR catalyst 150 and/or the upstream SCR catalyst 124 (jointly referred to herein as SCR catalyst 124 and/or 150) at engine shutdown. For example, when the engine is initially shutdown, a SCR temperature of the SCR catalyst 124 and/or 150 may be higher than a SCR temperature threshold (e.g., greater than 350 degrees Celsius) at which ammonia continues to desorb from the SCR catalyst 124 and/or 150. The controller 170 may be configured to, in response to receiving an engine shutdown signal (e.g., a user turning the inserting the ignition to an engine off position, pressing an engine stop button, transmitting an engine shutdown signal through a mobile app or remote server), the controller 170 determines an amount of ammonia stored on the SCR catalyst 124 and/or 150 included in the aftertreatment system 100. The controller 170 may be configured to determine the amount of ammonia stored on the SCR catalyst 124 and/or 150 based on a current temperature of the SCR catalyst 124 and/or 150, an ambient temperature, an exhaust gas temperature, an exhaust gas flow rate, amount of reductant inserted into the aftertreatment system 100 prior to engine shutdown signal being received, etc. In some embodiments, the controller 170 may include algorithms, equations, or lookup tables for determining the amount of ammonia stored on the SCR catalyst 124 and/or 150 based on one the one or more parameters described herein.

If the amount of ammonia stored on the SCR catalyst 124 and/or 150 is higher than an ammonia storage threshold, the controller 170 instructs the engine 10 to shutdown and shutdown of the engine 10 proceeds as normal. On the contrary, in response to determining that the ammonia stored in the SCR catalyst 124 and/or 150 is less than the ammonia storage threshold, the controller 170 causes flow of a heated gas towards the SCR catalyst 124 and 150 for a time period. The engine 10 remains running through this time period. In some embodiments, the ammonia storage threshold may be a fixed value determined based on the design of the SCR catalyst 124 and/or 150, and/or based on the minimum amount of stored ammonia used by the SCR catalyst 124 and/or 150 to provide a desired SCR catalytic CE (e.g., greater than 90%). In other embodiments, the controller 170 may be configured to determine the ammonia storage threshold based on at least one of emission limits of the aftertreatment system 100, the ambient temperature, or a maximum amount of reductant insertable into the aftertreatment system 100.

The gas used for heating the SCR catalyst 124 and/or 150 may include air or exhaust gas. In some embodiments, the heated gas flowing towards the SCR catalyst 124 and/or 150 includes exhaust gas being produced by the idling engine 10, and the temperature of the exhaust gas may be sufficient to maintain the SCR catalyst 124 and/or 150 at an ammonia storage temperature (e.g., in a range between 200 degrees Celsius to 300 degrees Celsius) at which the SCR catalyst 124 and/or 150 is capable of building ammonia storage. In some embodiments, the heated gas may include exhaust gas produced by the engine 10 which may be propelled by the turbo 106 towards the SCR catalysts 124 and 150. In some embodiments, the controller 170 may be further configured to activate a gas flow source, for example, the turbo 106 and/or the air pump 112, to cause the gas (e.g., air and/or exhaust gas) to flow towards the SCR catalyst 124 and/or 150.

In some embodiments, residual heat from the aftertreatment system 100 may be sufficient to heat the exhaust gas and/or air being communicated through the aftertreatment system to heat the SCR catalyst 124 and/or 150 to the ammonia storage temperature. In some embodiments, the controller 170 may be configured to activate the heater 108 included in the aftertreatment system 100 so as to cause heating of the gas flowing towards the SCR catalyst 124 and/or 150. The heater 108 may be powered via a power source (e.g., a battery associated with the engine 10, or an alternator coupled to the engine 10). In some embodiments, the controller 170 may be configured to activate the hydrocarbon insertion assembly 122 so as to cause insertion of hydrocarbons into the exhaust gas (e.g., through the hydrocarbon insertion port 153). In such embodiments, the oxidation catalyst 130 catalyzes combustion of the hydrocarbons flowing therethrough, resulting in heating of the exhaust gas or air flowing through the oxidation catalyst 130 towards the downstream SCR catalyst 150.

Simultaneously with flowing the heated exhaust gas or air towards the SCR catalyst 124 and 150, the controller 170 is configured to activate the reductant insertion assembly 120 so as to cause insertion of the reductant into the aftertreatment system, for example, through the reductant port 156 and/or the upstream reductant port 113. The controller 170 may be configured to determine the maximum amount of reductant insertable into the aftertreatment system 100 for ammonia storage buildup in the SCR catalyst 124 and/or 150 based on the maximum amount of reductant that can decompose completely when inserted into the exhaust gas or air passing through the aftertreatment system 100 (e.g., maximum amount of reductant insertable into the aftertreatment system 100 before reductant deposits start forming in the aftertreatment system 100), and/or the reductant insertion capability of the reductant insertion assembly 120. The ambient temperature at engine shutdown may be determined using an ambient temperature sensor, or received remotely via telematics (e.g., from a remote server). The controller 170 may be configured to determine the maximum amount of reductant insertable from algorithms, equations, or lookup tables (e.g., a reductant impingement map) stored in a memory of the controller 170, that use the target amount of ammonia to be stored on the SCR catalyst 124 and/or 150, the current amount of ammonia stored on the SCR catalyst 124 and/or 150, the flow rate of the gas (e.g., exhaust gas or air) flowing through the aftertreatment system 100, a temperature of the gas, and maximum reductant insertion capability of reductant insertion assembly 120.

The controller 170 is further configured to cause shutdown of the engine 10 in response to determining that the estimated amount of ammonia stored in the SCR catalyst 124 and/or 150 is equal to or greater than the ammonia storage threshold. For example, the controller 170 may continue to determine the estimated amount of ammonia stored on the SCR catalyst 124 and/or 150 during the ammonia build up cycle of the SCR catalyst 124 and/or 150. Once the controller 170 estimates that estimated amount of ammonia stored on the SCR catalyst 124 and/or 150 is approximately equal to or greater than the ammonia storage threshold (e.g., a target amount of stored ammonia), the controller 170 causes shutdown of the engine 10 that had previously been delayed to allow for ammonia buildup. In this manner, the SCR catalyst 124 and/or 150 will have sufficient ammonia stored next time that the engine 10 is started, which allows the SCR catalyst 124 and/or 150 to more realize high catalytic conversion efficiency on next engine start.

As previously discussed, for the SCR catalyst 124 and/or 150 to operate at optimal SCR catalytic CE, the SCR catalyst 124 and/or 150 should generally be operated at or above an SCR temperature threshold, i.e., operating temperature, for example, greater than 350 degrees Celsius. At engine start, particularly when the ambient temperatures are low (e.g., less than −10 degrees Celsius) or when the engine 10 is starting cold (e.g., substantial time has elapsed since last shutdown such that the engine 10 and the aftertreatment system 100 are at a temperature lower than 50 degrees Celsius), the SCR catalyst 124 and/or 150 have a SCR temperature that is lower than the operating temperature. In such instances, the SCR catalyst 124 and/or 150 may operate at lower SCR catalytic CE such that the SCR catalyst 124 and/or 150 are not able to decompose substantially all of the $NO_X$ gases in the exhaust gas, leading to $NO_X$ emissions exceeding allowable limits.

To improve SCR catalytic CE of the SCR catalyst 124 and/or 150 at engine start, additionally or alternatively to engine shutdown delay operations previously described herein, the controller 170 may be configured to delay engine start and preheat until the SCR catalyst 124 and/or 150 is at its operating temperature. Expanding further, in response to receiving an engine start signal (e.g., a user turning the inserting the ignition key to start position, pressing an engine start button, transmitting an engine start signal through a mobile app or remote server), the controller 170 may be configured to determine if a temperature of at least one of an aftertreatment component included in the aftertreatment system 100, a system associated with the aftertreatment system 100, and/or ambient environment (i.e., an ambient temperature) is less than a temperature threshold (e.g., less than 350 degrees Celsius) without starting the engine 10. In some embodiments, the aftertreatment component may be the SCR catalyst 124 and/or 150 and the controller 170 may be configured to receive temperature sensors disposed at an inlet, in a bed, and/or an outlet of the SCR catalyst 124 and/or 150 to determine the SCR temperature. In other embodiments, the aftertreatment component may include the oxidation catalyst 130 and or the filter 140. In some embodiments, the system associated with the aftertreatment system may include the engine 10, a coolant system (e.g., temperature of a coolant flowing in the coolant system), or a lubricant system (e.g., temperature of a lubricant flowing in the lubricant system).

In response to the temperature being less than the temperature threshold, the controller 170 activates the heater 108 included in the aftertreatment system 100 for a predetermined time (e.g., in a range of 10 seconds to 60 seconds, inclusive) without starting the engine 10. In some embodiments, the heater 108 may have a heater power greater than 10 kW (e.g., 12, 14, 16, 18, 20, 22, 24, 26, 28, 30, 32, 34, 36, 38, or 40 kW, inclusive), and is activated to operate at maximum heater power at engine start for heating a gas (e.g., air) flowing therethrough towards the SCR catalyst 124 and/or 150 to the threshold temperature. In some embodiments, the heater 108 may have sufficient power to reach at least 10 kW of power in less than 30 seconds. In other embodiments, the heater 108 may have sufficient power to reach at least 20 kW of power in less than 30 seconds.

The controller 170 is further configured to cause a flow of a gas through the heater (e.g., after the predetermined time has elapsed) towards the SCR catalyst 124 and/or 150 so as to heat the SCR catalyst 124 and/or 150. For example, the controller 170 may activate an air source to flow air towards the heater 108 and therethrough, towards the SCR catalyst 124 and 150. In some embodiments, the air source may include the turbo 106 and the controller 170 may activate the turbo 106 (e.g., provide power to the turbo 106 via the power source) to cause air to flow towards the heater 108 and therethrough towards the SCR catalyst 124 and/or 150. In other embodiments, the air source may include the reductant insertion assembly 120. For example, the reductant insertion assembly 120 may include an air assisted dosing system that insert a mixture or air and reductant into the aftertreatment system 100. In such embodiments, the controller 170 may be configured to cause the reductant insertion assembly 120 to insert only air through the upstream reductant port 113 upstream of the heater 108. The air then flows through the heater 108 towards the SCR catalyst 124 and 150 so as to heat the SCR catalyst 124 and/or 150. In some embodiments, the air source may include the air pump 112, and the controller 170 may be configured to activate the air pump 112 to cause air to flow towards the heater 108.

In response to the temperature (e.g., the SCR temperature) being equal to or greater than the temperature threshold (e.g., the SCR temperature threshold), the controller 170 is configured to cause the engine 10 to start. For example, the controller 170 may be configured to continually monitor the temperature of the SCR catalyst 124 and/or 150 as the air flowing through the heater 108 continues to heat the downstream located SCR catalysts 124 and/or 150. Once the temperature reaches the temperature threshold (e.g., the operating temperature of the SCR catalyst 124 and/or 150), the controller 170 sends an activation signal to the engine 10 (e.g., via an engine control unit) causing the engine 10 to start.

Thus delaying shutdown of the engine 10 while increasing ammonia storage of the SCR catalyst 124 and/or 150 and/or preheating the SCR catalyst 124 and/or 150 before starting the engine 10 causes the SCR catalyst 124 and/or 150 to operate at optimal SCR catalytic CE within a very short time after engine start, thereby allowing the aftertreatment system 100 to meet emission requirements even in cold start conditions. In addition, inserting reductant via the upstream reductant port 113 allows inclusion of the upstream SCR catalyst 124 in addition to the SCR catalyst 150 in the aftertreatment system 100. This may reduce the heat capacity needed by the heater 108 because the upstream SCR catalyst 124 is positioned upstream of all the other components and immediately downstream of the heater 108. This reduces thermal losses because of heat absorption by aftertreatment components disposed upstream thereof, for example, as is experienced by the SCR catalyst 150 due to heat absorption of heat by the oxidation catalyst 130, the filter 140, and the mixer 142, even if the upstream SCR catalyst 124 and the upstream $AMO_X$ catalyst 126 are excluded from the aftertreatment system 100. However, the concepts described herein are equally applicable to aftertreatment systems in which the upstream SCR catalyst 124 and the upstream $AMO_X$ catalyst 126 are excluded.

In some embodiments, in response to determining that a reductant in the reductant storage tank 110 is frozen, the controller 170 may be configured to cause heating of the reductant storage tank 110 to melt the reductant stored therein before the engine 10 is started. For example, when ambient conditions are lower than −10 degrees Celsius, the reductant stored in the reductant storage tank 110 can become frozen, and has to be thawed before the reductant can be inserted into the aftertreatment system 100. The controller 170 may be configured to determine an ambient temperature (e.g., via an ambient temperature sensor or telematics data received from a remote server or weather service) and in response to determining that the temperature is equal to or less than a low temperature threshold (e.g., equal to or less than −10 degrees Celsius), the controller 170 causes activation of a tank heater 111 coupled to the reductant storage tank 110. The tank heater 111 heats and at least partially thaws the reductant stored in the reductant storage tank 110 while the preheating cycle is in progress such that when the engine 10 is started, there is sufficient liquid reductant available for insertion into the aftertreatment system 100 for use the SCR catalyst 124 and/or 150.

Figure 3:
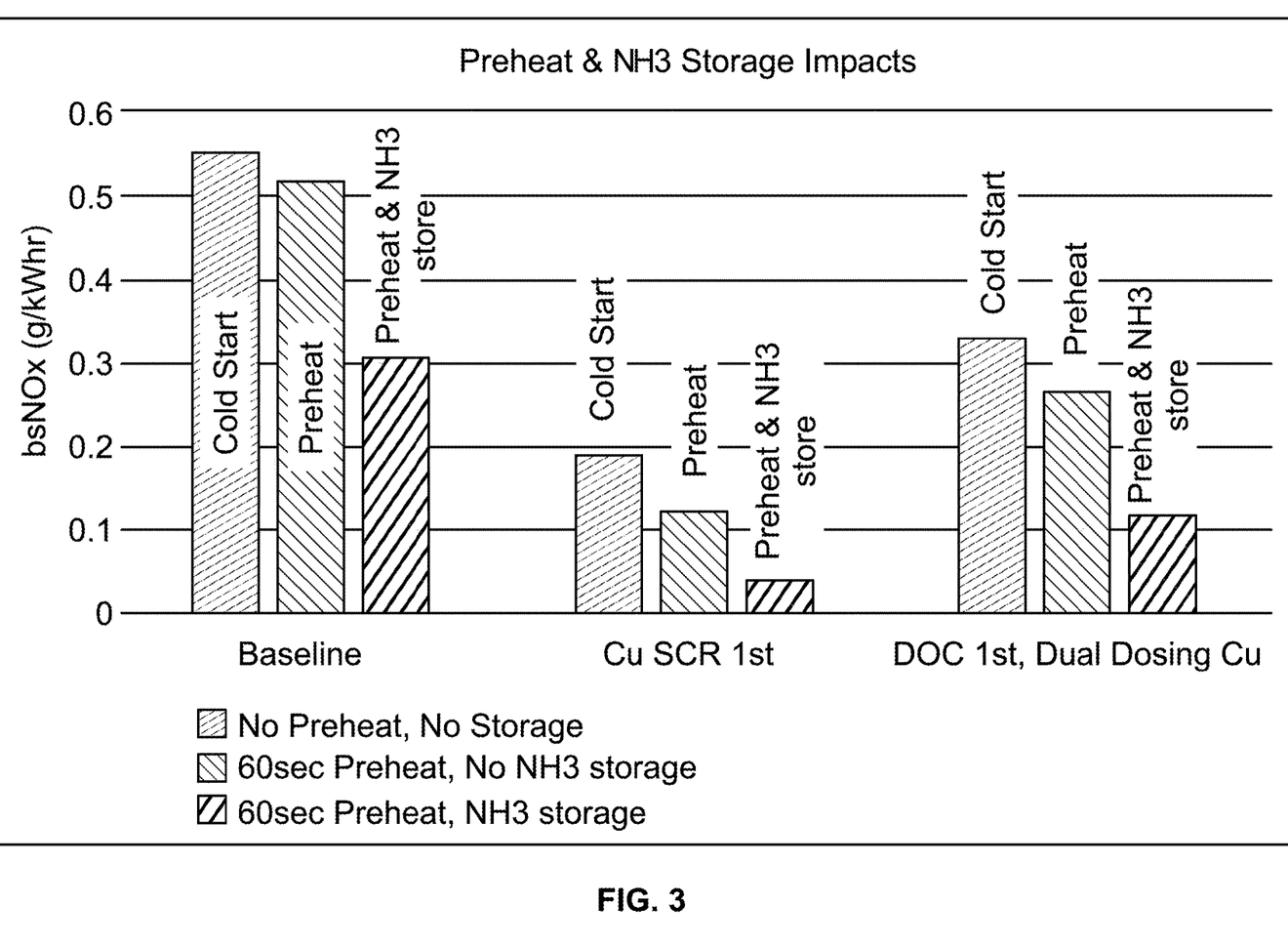
FIG. 3 is a bar chart illustrating the reduction on $NO_X$ emissions from various aftertreatment systems by only preheating the aftertreatment system at engine start, and by preheating the aftertreatment system at engine start along with enhancing ammonia storage in the SCR catalyst at engine shutdown.

FIG. 3 is a bar chart illustrating the reduction on $NO_X$ emissions from various aftertreatment systems by only preheating the aftertreatment system at engine start, and by preheating the aftertreatment system at engine start along with enhancing ammonia storage in the SCR catalyst at engine shutdown. Tests were performed for three systems, a baseline aftertreatment system ("baseline system") that includes only a downstream SCR catalyst (e.g., the SCR catalyst 150), a Cu SCR $1^{st}$ aftertreatment system ("first system") that includes only an upstream copper zeolite catalyst disposed at an upstream location (e.g., immediately downstream of the heater 108), and a DOC $1^{st}$, Dual dosing Cu aftertreatment system ("second system") that is substantially similar to the aftertreatment system 100 shown in FIG. 1 and includes the upstream SCR catalyst 124 and the downstream SCR catalyst 150. For each of the baseline system, the first system, and the second system, the highest $NO_X$ emissions are observed when neither ammonia storage nor preheating as described herein are used. Preheating for 60 seconds results in slight reduction in $NO_X$ emissions, while using the ammonia storage cycle before engine shutdown and then preheating for 60 seconds while delaying engine start results in 40% or higher reduction in $NO_X$ emissions relative to when neither preheating nor ammonia storage cycles are employed.

Figure 2:
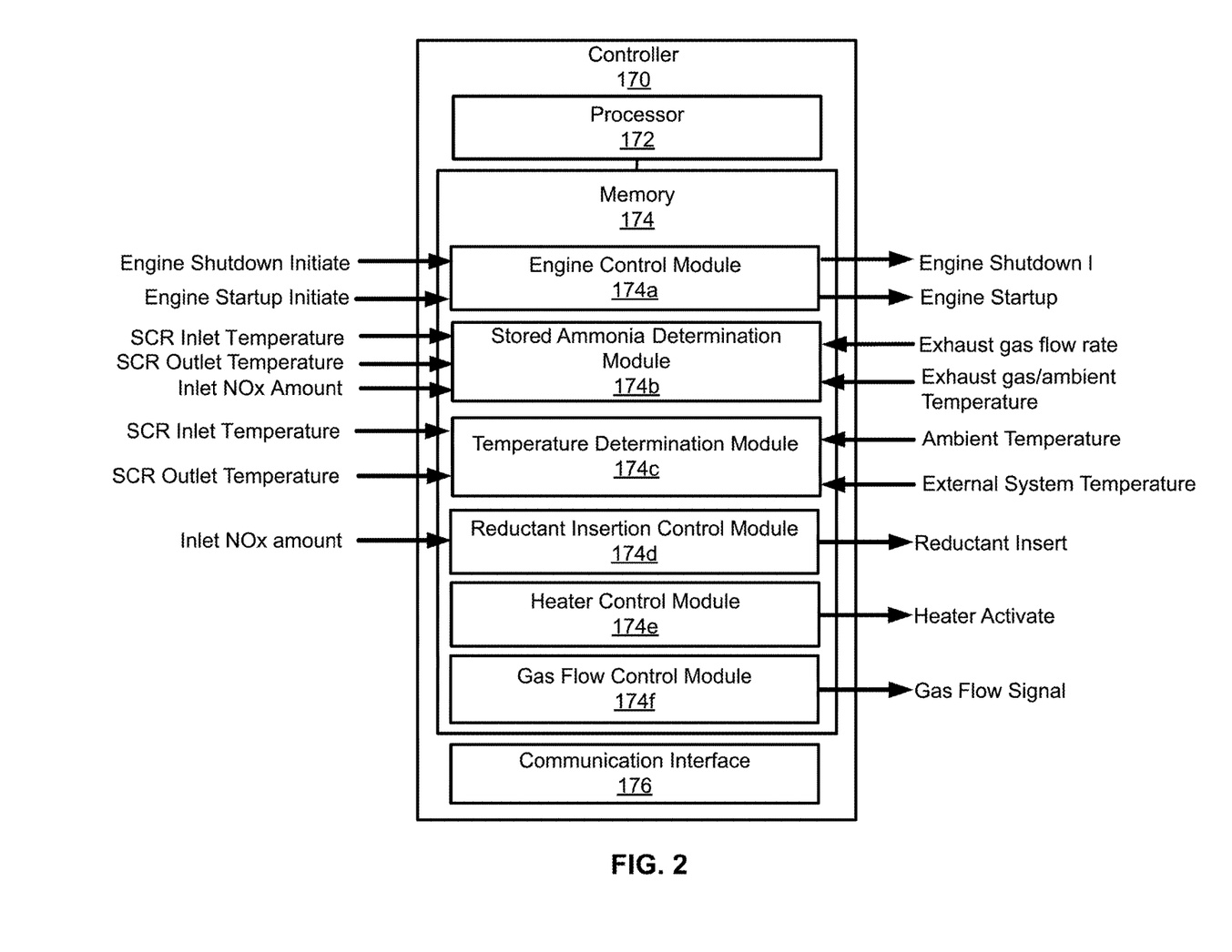
FIG. 2 is a schematic block diagram of a controller that may be included in the aftertreatment system of FIG. 1, according to an embodiment.

In some embodiments, the controller 170 includes various circuitries or modules configured to perform the operations of the controller 170 described herein. For example, FIG. 2 shows a schematic block diagram of the controller 170, according to an embodiment. The controller 170 may include a processor 172, a memory 174, or any other computer readable medium, and a communication interface 176. Furthermore, the controller 170 includes an engine control module 174a, a stored ammonia determination module 174b, a temperature determination module 174c, a reductant insertion control module 174d, a heater control module 174e, and a gas flow control module 174f. It should be understood that FIG. 2 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the engine control module 174a, the stored ammonia determination module 174b, the temperature determination module 174c, the reductant insertion control module 174d, the heater control module 174e, and the gas flow control module 174f are embodied as machine or computer-readable media (e.g., stored in the memory 174) that is executable by a processor, such as the processor 172. As described herein and amongst other uses, the machine-readable media (e.g., the memory 174) facilitates performance of certain operations of the engine control module 174a, the stored ammonia determination module 174b, the temperature determination module 174c, the reductant insertion control module 174d, the heater control module 174e, and the gas flow control module 174f to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the engine control module 174a, the stored ammonia determination module 174b, the temperature determination module 174c, the reductant insertion control module 174d, the heater control module 174e, and the gas flow control module 174f are embodied as hardware units, such as electronic control units. As such, the engine control module 174a, the stored ammonia determination module 174b, the temperature determination module 174c, the reductant insertion control module 174d, the heater control module 174e, and the gas flow control module 174f may be embodied as one or more circuitry components including, but not limited to, processing circuitry, network interfaces, peripheral devices, input devices, output devices, sensors, etc.

In some embodiments, the engine control module 174a, the stored ammonia determination module 174b, the temperature determination module 174c, the reductant insertion control module 174d, the heater control module 174e, and the gas flow control module 174f may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the engine control module 174a, the stored ammonia determination module 174b, the temperature determination module 174c, the reductant insertion control module 174d, the heater control module 174e, and the gas flow control module 174f may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the engine control module 174a, the stored ammonia determination module 174b, the temperature determination module 174c, the reductant insertion control module 174d, the heater control module 174e, and the gas flow control module 174f may also include programmable hardware devices such as field programmable gate arrays, programmable array logic, programmable logic devices or the like. In this regard, the engine control module 174a, the stored ammonia determination module 174b, the temperature determination module 174c, the reductant insertion control module 174d, the heater control module 174e, and the gas flow control module 174f may include one or more memory devices for storing instructions that are executable by the processor(s) of the engine control module 174a, the stored ammonia determination module 174b, the temperature determination module 174c, the reductant insertion control module 174d, the heater control module 174e, and the gas flow control module 174f. The one or more memory devices and processor(s) may have the same definition as provided below with respect to the memory 174 and the processor 172.

In the example shown, the controller 170 includes the processor 172 and the memory 174. The processor 172 and the memory 174 may be configured or programmed to execute or implement the instructions, commands, and/or control processes described herein with respect to the engine control module 174a, the stored ammonia determination module 174b, the temperature determination module 174c, the reductant insertion control module 174d, the heater control module 174e, and the gas flow control module 174f. Thus, the depicted configuration represents the aforementioned arrangement in which the engine control module 174a, the stored ammonia determination module 174b, the temperature determination module 174c, the reductant insertion control module 174d, the heater control module 174e, and the gas flow control module 174f are embodied as machine or computer-readable media. However, as mentioned above, this illustration is not meant to be limiting as the present disclosure contemplates other embodiments such as the aforementioned embodiment where the engine control module 174a, the stored ammonia determination module 174b, the temperature determination module 174c, the reductant insertion control module 174d, the heater control module 174e, and the gas flow control module 174f, or at least one circuit of the engine control module 174a, the stored ammonia determination module 174b, the temperature determination module 174c, the reductant insertion control module 174d, the heater control module 174e, and the gas flow control module 174f are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the engine control module 174a, the stored ammonia determination module 174b, the temperature determination module 174c, the reductant insertion control module 174d, the heater control module 174e, and the gas flow control module 174f) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the first sensor 103, the second sensor 105, the turbo 106, the air pump 112, the reductant insertion assembly 120, the hydrocarbon insertion assembly 122, and the engine 10. The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The engine control module 174a, is configured to generate an engine shutdown signal configured to cause the engine 10 to shutdown, or generate an engine start signal configured to cause the engine 10 to start. For example, in response to receiving an engine shutdown initiate signal (e.g., from a user) and an amount of ammonia stored on the SCR catalyst 124 and/or 150 being less than the ammonia storage threshold, the engine control module 174a may delay generating the engine shutdown signal for shutting down the engine 10 until sufficient ammonia is stored on the SCR catalyst 124 and/or 150 as previously described herein. Similarly, in response to receiving an engine start initiate signal and a temperature of at least one of an aftertreatment component (e.g., the SCR catalyst 124 and/or 150), a system associated with the aftertreatment system 100 (e.g., the engine 10, or an external system such as a coolant system, a lubricant system, etc.), being less than the temperature threshold, the engine control module 174a may be configured to delay generating the engine start signal for starting the engine 10, until the temperature is equal to or greater than the temperature threshold, as previously described herein.

The stored ammonia determination module 174b is configured to determine an amount of ammonia stored in the SCR catalyst 124 and/or 150, for example, in response to the engine control module 174a receiving the engine shutdown initiate signal. For example, the stored ammonia determination module 174b may be configured to determine the amount of ammonia stored on the SCR catalyst 124 and/or 150 based on a current temperature of the SCR catalyst 124 and/or 150, for example, determined from a SCR inlet temperature signal and/or a SCR outlet temperature), ambient temperature, an exhaust gas temperature, an exhaust gas flow rate, amount of reductant inserted into the aftertreatment system 100 prior to engine shutdown signal being received, etc. (e.g., via an embedded physics based ammonia storage model that is configured to receive one or more these parameters as inputs and determine the amount of ammonia storage therefrom). In some embodiments, the amount of ammonia stored may be determined via a radio frequency (RF) based measurement (e.g., via an RF sensor included in the aftertreatment system 100). In some embodiments, the stored ammonia determination module 174b may also be configured to determine the ammonia storage threshold based on at least one of emission limits of the aftertreatment system 100, the ambient temperature, or a maximum amount of reductant insertable into the aftertreatment system 100 at engine start. The stored ammonia determination module 174b may be configured to monitor an amount of ammonia stored on the SCR catalyst 124 and/or 150 in real time and communicate a signal to the engine control module 174a to generate the engine shutdown signal once the ammonia stored on the SCR catalyst 124 and/or 150 is equal to or greater than the ammonia storage threshold.

The temperature determination module 174c is configured to determine a temperature of the SCR catalyst 124 and/or 150, for example, based on an SCR inlet temperature, an outlet temperature signal, and/or SCR bed temperature signal received from temperature sensors included in the aftertreatment system 100, a temperature of an external system (e.g., the engine 10, the coolant or lubricant systems, etc.) associated with the aftertreatment system 100, and/or ambient temperature. In some embodiments, in response to the engine control module 174a receiving the engine start signal, the temperature determination module 174c may be configured to determine if the temperature is less than the temperature threshold. If the temperature is less than the temperature threshold, the engine control module 174a delays start of the engine 10, as previously described herein.

The reductant insertion control module 174d is configured to determine an amount of reductant to be inserted into the aftertreatment system 100 (e.g., based on an inlet $NO_X$ amount signal), and generate a reductant insert signal to cause insertion of the amount of reductant into the aftertreatment system 100 (e.g., the upstream reductant port 113 and/or the reductant port 156) via the reductant insertion assembly 120. In some embodiments, the reductant insertion control module 174d may be configured to determine the maximum amount of reductant insertable into the aftertreatment system 100, for example, from algorithms, equations, or lookup tables (e.g., a reductant impingement map) stored therein, that use the target amount of ammonia to be stored on the SCR catalyst 124 and/or 150, the current amount of ammonia stored on the SCR catalyst 124 and/or 150, the flow rate of the gas (e.g., exhaust gas or air) flowing through the aftertreatment system 100, a temperature of the gas, and maximum reductant insertion capability of reductant insertion assembly 120 to determine the maximum amount of reductant insertable into the aftertreatment system 100.

The heater control module 174e is configured to selectively activate the heater 108, for example, for a predetermined time. For example, in response to the stored ammonia determination module 174b determining that the ammonia stored in the SCR catalyst 124 and/or 150 is less than an ammonia storage threshold at engine shutdown, the heater control module 174e may generate a heater activation signal to cause activation of the heater 108 so as to heat the gas (e.g., exhaust gas or air) communicated towards the SCR catalyst 124 and/or 150. Similarly, in response to the temperature determination module 174c determining at engine start that the temperature of the SCR catalyst 124 and/or 150, the external system, and/or ambient temperature is less than the temperature threshold, the heater control module 174e may cause activation of the heater 108 to heat the air to preheat the SCR catalyst 124 and/or 150, as previously described herein. In some embodiments, the heater control module 174e may be configured to cause activation of the heater 108 for a predetermined time without the engine 10 being started or gas being flown through the heater 108.

The gas flow control module 174f is configured to selectively cause flow of exhaust gas and/or air through the aftertreatment system 100. For example, the gas flow control module 174f may be configured to generate a gas flow signal to cause activation of the turbo 106, or the air pump 112 to cause exhaust gas and/or air to flow through the aftertreatment system 100 (e.g., at engine shutdown or engine start, as previously described herein).

Figure 4:
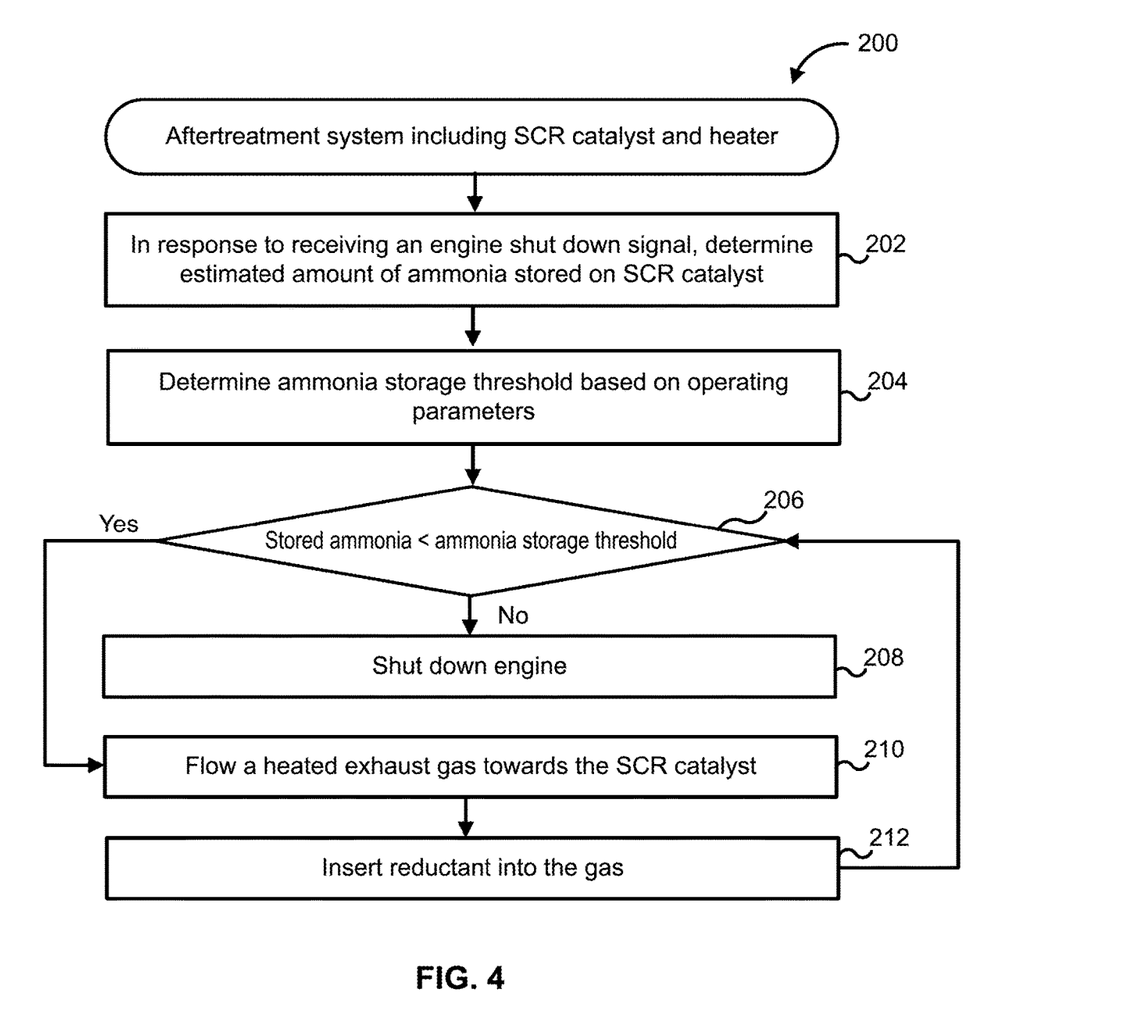
FIG. 4 is a schematic flow chart of a method for reducing $NO_X$ emissions from an aftertreatment system by optimizing ammonia storage in a SCR catalyst on engine shutdown, according to an embodiment.

FIG. 4 is a schematic flow chart of an example method 200 for building ammonia storage in a SCR catalyst (e.g., the SCR catalyst 124 and/or 150) of an aftertreatment system (e.g., the aftertreatment system 100) before shutting down of an engine (e.g., the engine 10) associated with the aftertreatment system so as to enable high SCR catalytic CE and reduce $NO_X$ emissions at a subsequent engine start. While described with reference to the controller 170 and the SCR catalyst 124 and 150 of the aftertreatment system 100, the operations of the method 200 can be used with any controller included in any aftertreatment system.

The method 200 may include determining, by the controller 170, an amount of ammonia stored on the SCR catalyst 124 and/or 150, in response to receiving an engine shutdown signal, at 202. For example, the controller 170 may determine the amount of the ammonia stored on the SCR catalyst 124 and/or 150 using equations, algorithms, or lookup tables, as previously described herein. In some embodiments, the controller 170 may also determine an ammonia storage threshold based on operating parameters of the aftertreatment system 100, at 204, as previously described herein. Such parameters may include, for example, at least one of emission limits of the aftertreatment system 100, the ambient temperature, or a maximum amount of reductant insertable into the aftertreatment system 100 at engine start.

At 206, the controller 170 determines whether the amount of ammonia stored on the SCR catalyst 124 and/or 150 is less than the ammonia storage threshold. If the amount of stored ammonia is greater than the ammonia storage threshold (206:NO), the method 200 proceeds to operation 208, and the controller 170 causes shutdown of the engine 10.

In response to the amount of ammonia stored on the SCR catalyst 124 and/or 150 being less than the ammonia storage threshold (206:YES), the controller 170 causes flow of a heated gas towards the SCR catalyst 124 and/or 150, at 210. For example, the heated gas may be exhaust gas being generated by the idling engine 10. In other embodiments, the controller 170 may cause activation of the turbo 106 or the air pump 112 to cause exhaust gas or air to flow towards the SCR catalyst 124 and/or 150. In some embodiments, the controller 170 may also activate the heater 108 to heat the exhaust gas or air flowing towards the SCR catalyst 124 and 150.

At 212, the controller 170 causes insertion of reductant into the aftertreatment system 100. The reductant mixes with the heated gas as it flows towards the SCR catalyst 124 and/or 150 and builds up ammonia storage on the SCR catalyst 124 and/or 150. The method then returns to operation 206, operations 208 and 210 are continued until the amount of ammonia stored on the SCR catalyst 124 and/or 150 becomes equal to or greater than the ammonia storage threshold. The method 200 then proceeds to operation 208 and the controller 170 causes shutdown of the engine 10.

Figure 5:
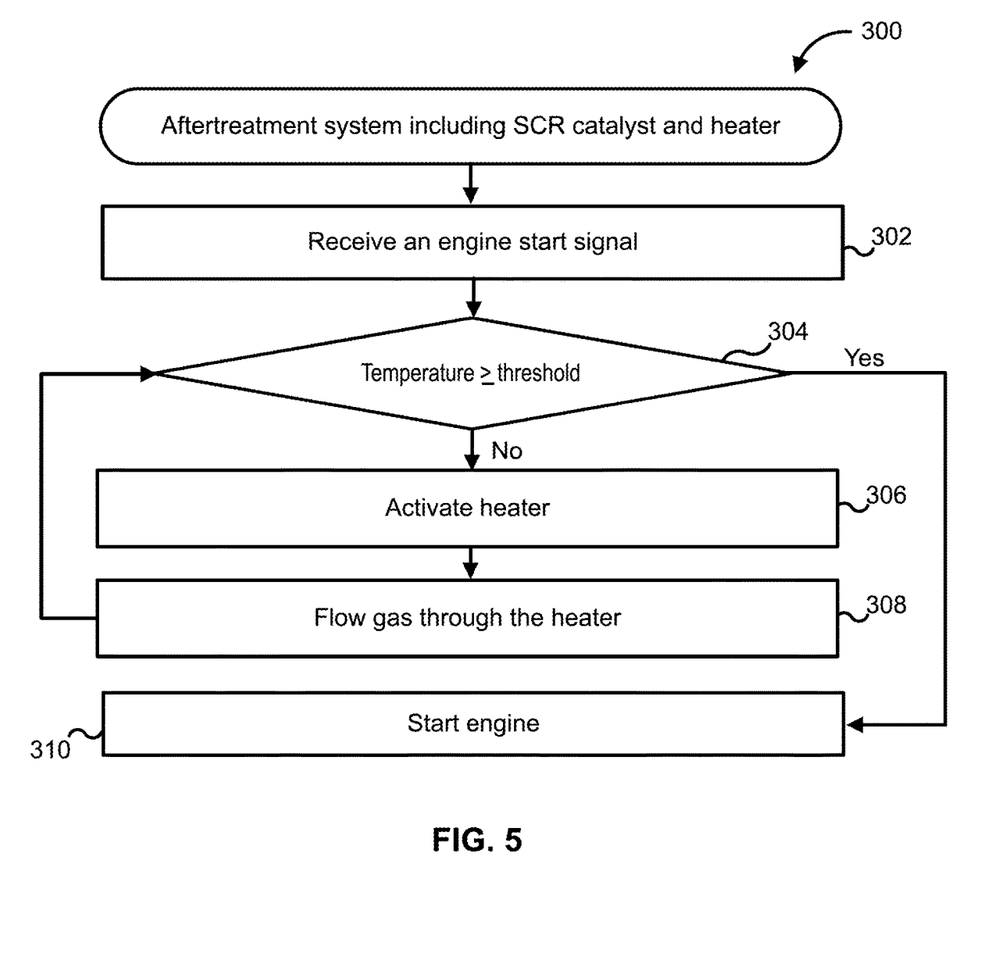
FIG. 5 is a schematic flow chart of a method for reducing $NO_X$ emissions from an aftertreatment system by preheating the aftertreatment system before engine start, according to an embodiment.

FIG. 5 is a schematic flow chart of a method 300 for preheating a SCR catalyst (e.g., the SCR catalyst 124 and/or 150) included in an aftertreatment system (e.g., the aftertreatment system 100) before starting an engine (e.g., the engine 10) associated with the aftertreatment system so as to increase SCR catalytic CE of the SCR catalyst 124 and/or 150 at engine start and reduce $NO_X$ emissions. While the operations of the method 300 are described with respect to the controller 170 and the SCR catalyst 124 and 150 of the aftertreatment system 100, it should be understood that the operations of the method 300 can be implemented in any controller for use with any aftertreatment system. While method 200 and 300 are described as separate methods, in various embodiments, the operations of each of the methods 200 and 300 may be implemented in the same controller and may be combined in a single method, or instructions stored on the same controller.

The method 300 includes receiving an engine start signal, at 302. For example, a user may transmit an engine start signal to the controller 170 (e.g., turning an ignition key to start position, press an engine start button, or transmitting an engine start signal through a mobile app or remote server). At 304, the controller 170 determines whether a temperature of at least one of an aftertreatment component included in the aftertreatment system 100 (e.g., the SCR catalyst 124 and/or 150, the oxidation catalyst 130 and/or the filter 140), a system associated with the aftertreatment system 100 (e.g., the engine 10, a coolant or lubricant system, or any other external system), and/or the ambient environment is less than a temperature threshold. For example, the controller 170 may receive a temperature signal from an inlet, outlet, or bed SCR temperature sensor associated with the SCR catalyst 124 and/or 150 and interpret the signal/s to determine the SCR temperature of the SCR catalyst 124 and/150, and/or signals from other temperature sensors operatively coupled to the oxidation catalyst 130, the filter 140, the external system, and/or a physical or virtual ambient temperature.

If the temperature is equal to or greater than the temperature threshold (304:YES), the method 300 proceeds to operation 310, and controller 170 causes the engine 10 to start (e.g., communicate an engine start signal to an engine control unit to start the engine 10). In response to the temperature being less than the temperature (304:NO), the controller 170 causes the heater 108 included in the aftertreatment system 100 to activate, at 306. At 308, the controller 170 causes flow of a gas through the heater 108 towards the SCR catalyst 124 and/or 150 so as to heat the SCR catalyst 124 and/or 150. For example, the controller 170 activates the turbo 106 or the air pump 112 to cause air to flow towards the heater 108 and therethrough towards the SCR catalyst 124 and 150. Once the temperature (e.g., the SCR temperature) becomes equal to or greater than the temperature threshold (e.g., the SCR temperature threshold), the method proceeds to operation 310, and the controller 170 causes the engine 10 to start.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the terms "about" and "approximately" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A controller for an aftertreatment system coupled to an engine, the controller configured to:
   in response to receiving an engine start signal, determine if a temperature of a selective catalyst reductant (SCR) catalyst is less than a temperature threshold without starting the engine;
   in response to the temperature being less than the temperature threshold, activate a heater located upstream of the SCR catalyst for a predetermined period of time without starting the engine, and cause flow of a gas through the heater towards the SCR catalyst included in the aftertreatment system so as to heat the SCR catalyst; and
   in response to the temperature being equal to or greater than the temperature threshold, cause the engine to start.

2. The controller of claim 1, wherein:
   the controller is configured to cause the flow of the gas through the heater towards the SCR catalyst by activating an electric turbo disposed upstream of the heater without starting the engine.

3. The controller of claim 1, wherein:
   the controller is configured to cause the flow of the gas through the heater towards the SCR catalyst by activating an air pump disposed upstream of the heater without starting the engine.

4. The controller of claim 1, wherein, in determining if the temperature is less than the temperature threshold without starting the engine, the controller is configured to determine if the temperature of the SCR catalyst is less than the temperature threshold without starting the engine.

5. An aftertreatment system configured to be coupled to an engine, the aftertreatment system comprising:
   a selective catalytic reduction (SCR) catalyst;
   a heater; and
   a controller configured to:
      in response to receiving an engine start signal, determine if a temperature of the SCR catalyst is less than a temperature threshold without starting the engine;
      in response to the temperature being less than the temperature threshold, activate the heater located upstream of the SCR catalyst for a predetermined period of time without starting the engine, and cause flow of a gas through the heater towards the SCR catalyst so as to heat the SCR catalyst; and
      in response to the temperature being equal to or greater than the temperature threshold, cause the engine to start.

6. The aftertreatment system of claim 5, further comprising:
   an electric turbo disposed upstream of the heater, wherein the controller is configured to cause the flow of the gas through the heater towards the SCR catalyst by activating the electric turbo without starting the engine.

7. The aftertreatment system of claim 5, further comprising:
   an air pump disposed upstream of the heater, wherein the controller is configured to cause the flow of the gas through the heater towards the SCR catalyst by activating the air pump without starting the engine.

8. The aftertreatment system of claim 5, wherein, in determining if the temperature is less than the temperature threshold without starting the engine, the controller is configured to determine if the temperature of the SCR catalyst is less than the temperature threshold without starting the engine.

9. The aftertreatment system of claim 5, wherein the heater is configured to reach at least 10 kW of power in less than 30 seconds.

* * * * *